United States Patent
Ryu et al.

(10) Patent No.: US 9,075,285 B2
(45) Date of Patent: Jul. 7, 2015

(54) PHOTOGRAPHY DEVICE WITH ANTI-SHAKE FUNCTION

(71) Applicant: HYSONIC. CO., LTD., Ansan-si (KR)

(72) Inventors: Jae-Wook Ryu, Ansan (KR); He-Won Jung, Ansan (KR); Hye-Kyoung Ji, Ansan-si (KR)

(73) Assignee: HYSONIC. CO., LTD. (KR)

( * ) Notice: Subject to any disclaimer, the term of this patent is extended or adjusted under 35 U.S.C. 154(b) by 98 days.

(21) Appl. No.: 14/012,070

(22) Filed: Aug. 28, 2013

(65) Prior Publication Data

US 2013/0343738 A1 Dec. 26, 2013

Related U.S. Application Data

(62) Division of application No. 12/992,418, filed as application No. PCT/KR2009/001644 on Mar. 31, 2009, now Pat. No. 8,681,227.

(30) Foreign Application Priority Data

| | | |
|---|---|---|
| May 14, 2008 | (KR) | 10-2008-0044348 |
| Oct. 15, 2008 | (KR) | 10-2008-0101010 |
| Dec. 17, 2008 | (GB) | 10-2008-0128375 |
| Mar. 20, 2009 | (KR) | 10-2009-0023717 |
| Mar. 20, 2009 | (KR) | 10-2009-0023718 |

(51) Int. Cl.
| | |
|---|---|
| *H04N 5/228* | (2006.01) |
| *G03B 5/00* | (2006.01) |
| *H04N 5/225* | (2006.01) |
| *H04N 5/232* | (2006.01) |
| *G03B 5/02* | (2006.01) |

(52) U.S. Cl.
CPC .............. *G03B 5/00* (2013.01); *H04N 5/2252* (2013.01); *H04N 5/2254* (2013.01); *H04N 5/2257* (2013.01); *H04N 5/23248* (2013.01); *H04N 5/23287* (2013.01); *G03B 5/02* (2013.01)

(58) Field of Classification Search
CPC .. H04N 5/2252; H04N 5/2254; H04N 5/2257
USPC ................................. 348/46, 208.2; 396/55
See application file for complete search history.

(56) References Cited

U.S. PATENT DOCUMENTS

| | | | |
|---|---|---|---|
| 5,266,988 A | | 11/1993 | Washisu |
| 2007/0154198 A1* | | 7/2007 | Oh et al. ................... 396/85 |

FOREIGN PATENT DOCUMENTS

| | | |
|---|---|---|
| JP | 1999-013837 | 4/1999 |
| KR | 10-2007-0120260 | 12/2007 |

OTHER PUBLICATIONS

International Search Report—PCT/KR2009/001644 dated May 29, 2009.

* cited by examiner

*Primary Examiner* — Usman Khan
(74) *Attorney, Agent, or Firm* — Cantor Colburn LLP

(57) ABSTRACT

A photography device with anti-shake function for sensing camera shake and moving a lens toward a direction to correct the camera shake when photographing an object so that the object may be clearly photographed. A coil and a magnet are included in the invention, and the coil moves in a direction perpendicular to the optical-axis of the lens as a result of magnetic fields generated by the magnet and the coil when electric power is applied to the coil.

7 Claims, 6 Drawing Sheets

PHOTOGRAPHY DEVICE WITH ANTI-SHAKE FUNCTION

BACKGROUND OF THE INVENTION

1. Field of the Invention

The present invention relates to a photography device with anti-shake function, and more particularly, to a photography device which senses shake of the photography device and moves lens in a direction correcting the shake to thereby allow an object to be clearly photographed.

2. Description of the Prior Art

In recent, compact electronic devices including a communication device such as a cellular phone are equipped with a compact photography device for photographing an image. These photography devices are characterized by compact and simple structure.

These photography devices includes a lens group consisting of a plurality of lenses and an image pickup device which converts optical signals transmitted through the lens group into electric signals.

However, when a user's hand grasping the electronic device equipped with the photography device is shaken or vibration is transferred to the electronic device by another external factor, the vibration is transferred to the photography device and thus the image of an object is blurred.

A support is required to photograph a clear image Due to this problem, but is hardly used since it is uncomfortable to be carried.

Therefore, deterioration in an image due to shake is inevitable for the general photography device for electronic devices.

SUMMARY OF THE INVENTION

Embodiments of the present invention are directed to a photography device which senses shake of the photography device upon photographing of an object and moves lens in a direction correcting the shake to thereby allow the object to be clearly photographed.

In one embodiment, a photography device with anti-shake function includes: a housing; a first blade disposed movably in an up and down direction in an inside of the housing and mounted with a first coil member in an outside thereof; a second blade disposed horizontally movably in an inside of the first blade and mounted with a second coil member in an outside thereof; and a magnet disposed between an inner surface of the first blade and an outer surface of the second blade, wherein the first blade and the second blade moves up and down together by interaction of a first electromagnetic field generated when power is applied to the first coil member with a magnetic field generated in the magnet, and the second blade moves horizontally independently from the first blade by interaction of a second electromagnetic field generated when the power is applied to the second coil member with the magnetic field generated in the magnet.

The photography device further includes: a base mounted to a lower side of the housing, wherein the magnet has one surface disposed towards the first coil member and the other surface disposed towards the second coil member and fixed to the base, and the first coil member is wound around the first blade and the second coil member is wound on a side surface of the second blade in a direction perpendicular to the winding direction of the first coil member.

The photography device further includes: a first elastic member having an outside fixed to the housing and an inside mounted to the first blade to elastically support the first blade in an up and down direction, wherein the first elastic member includes a conductor layer connected with an external power source to transfer power to the first coil member and the second coil member; and an insulation layer which coats the conductor layer.

The photography device further includes: a second elastic member having one end mounted to the first blade and the other end mounted to the second blade and supporting the second blade in a horizontal direction, wherein the coil member receives external power as an end of the first coil member is electrically connected with the conductor layer of the first elastic member, and the second coil member receives the external power as an end of the second coil member is electrically connected with the other end of the second elastic member and one end of the second elastic member is electrically connected with the conductor layer of the first elastic member.

An upper side of the first blade is formed with a through hole in which the magnet is penetratively inserted when the first blade moves up and down.

The photography device further includes: a yoke member which is in contact with the magnet, wherein the magnet includes a first magnet which is in contact with an upper surface of the yoke member and a second magnet which is in contact with a lower surface of the yoke member, and polarities of the first magnet and second magnet are formed in an up and down direction such that the polarities are disposed symmetrically in the up and down direction, and the yoke member has one surface disposed towards the first coil member and the other surface disposed towards the second coil member.

The yoke member is formed with a magnetism inducement projection which projects towards the second coil member and inserted in a center of the second coil member and the magnetism inducement projection induces the magnetic field of the magnet towards the second coil member.

The photography device with anti-shake function of the present invention can move the lens in a direction correcting shake when the shake is generated upon photographing of an object to thereby allow the object to be clearly photographed.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, an embodiment of the present invention will be described.

Figure 1:
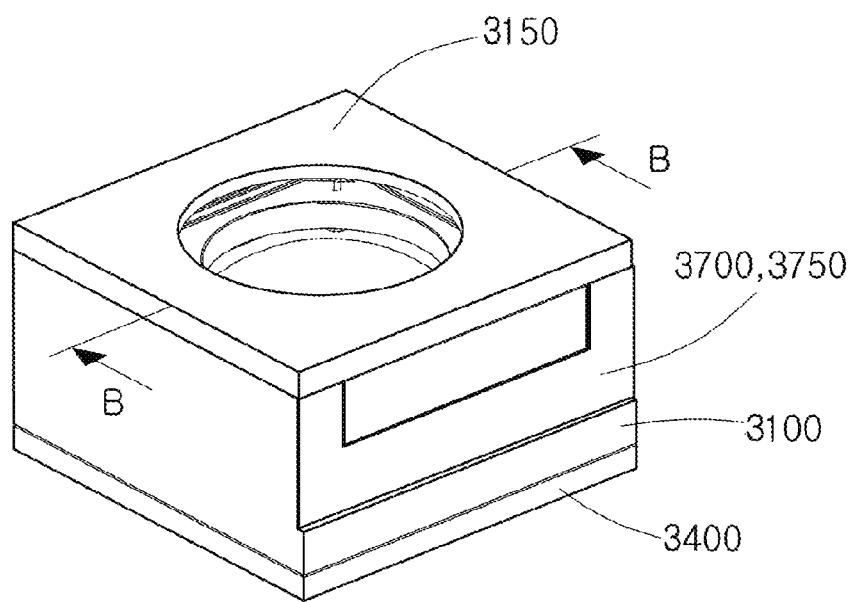
FIG. 1 is a perspective view illustrating a photography device with anti-shake function in accordance with an embodiment of the present invention.
Figure 2:
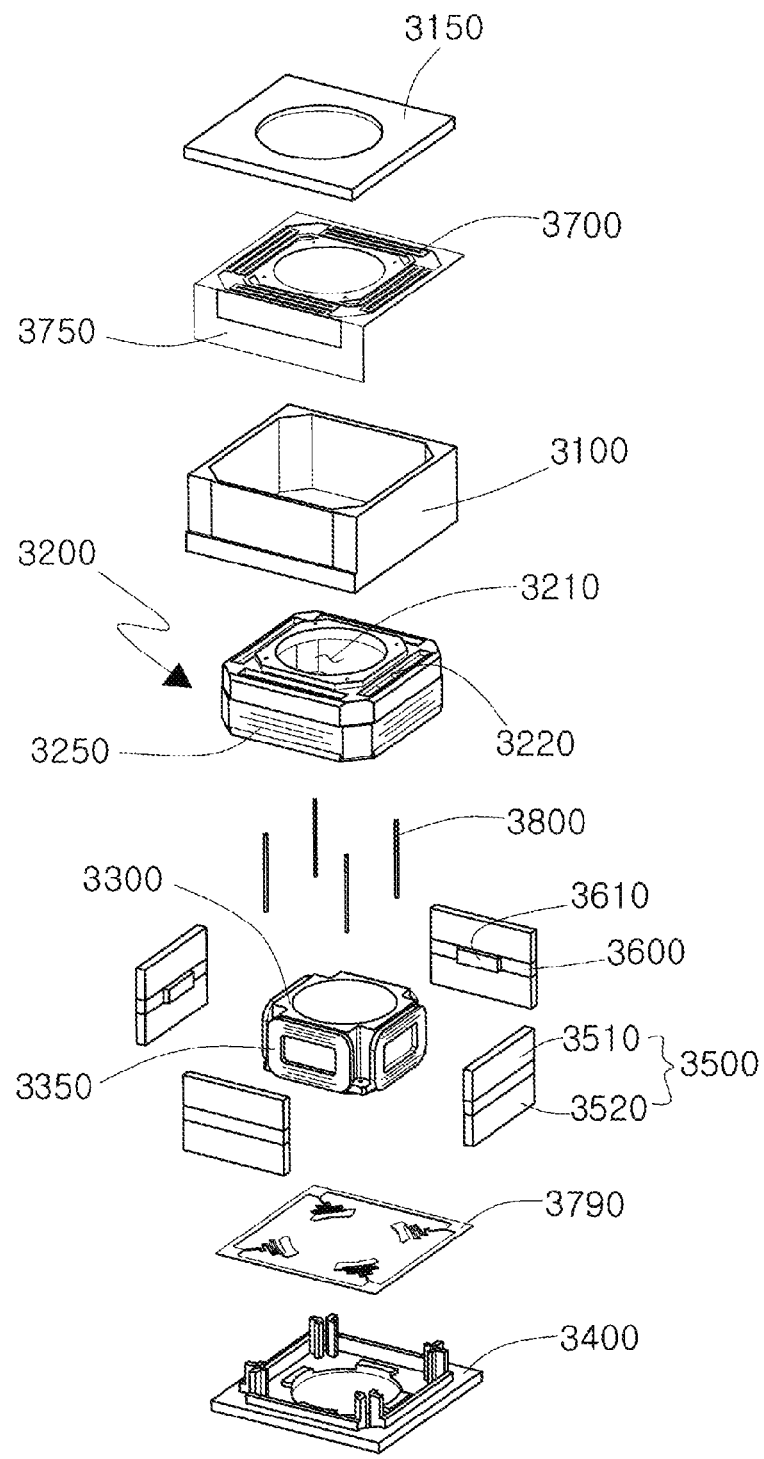
FIG. 2 is an exploded perspective view illustrating the photography device of FIG. 1, viewed from one direction.
Figure 3:
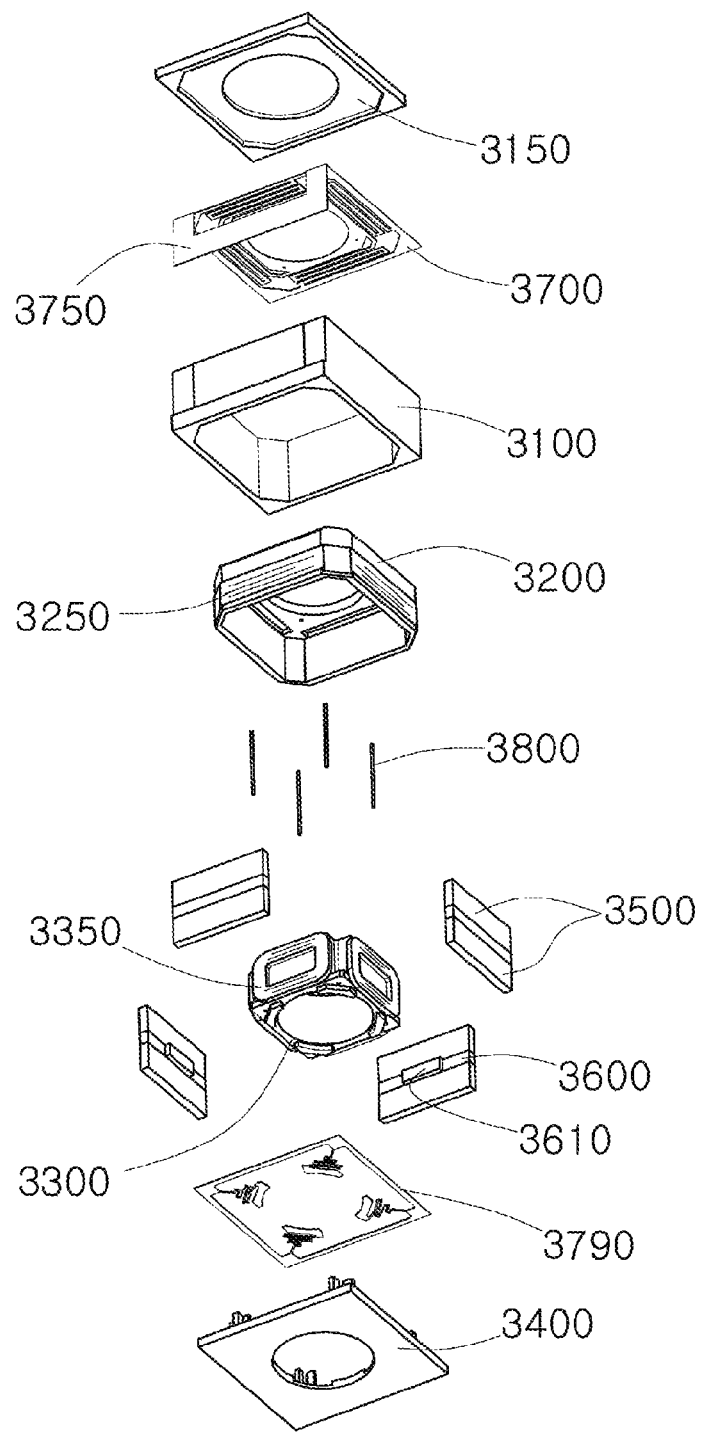
FIG. 3 is an exploded perspective view illustrating the photography device of FIG. 1, viewed from another direction.

FIG. 1 is a perspective view illustrating a photography device with anti-shake function in accordance with the fifth embodiment of the present invention; FIG. 2 is an exploded perspective view illustrating the photography device of FIG. 1, viewed from one direction; and FIG. 3 is an exploded perspective view illustrating the photography device of FIG. 1, viewed from another direction.

Figure 4:
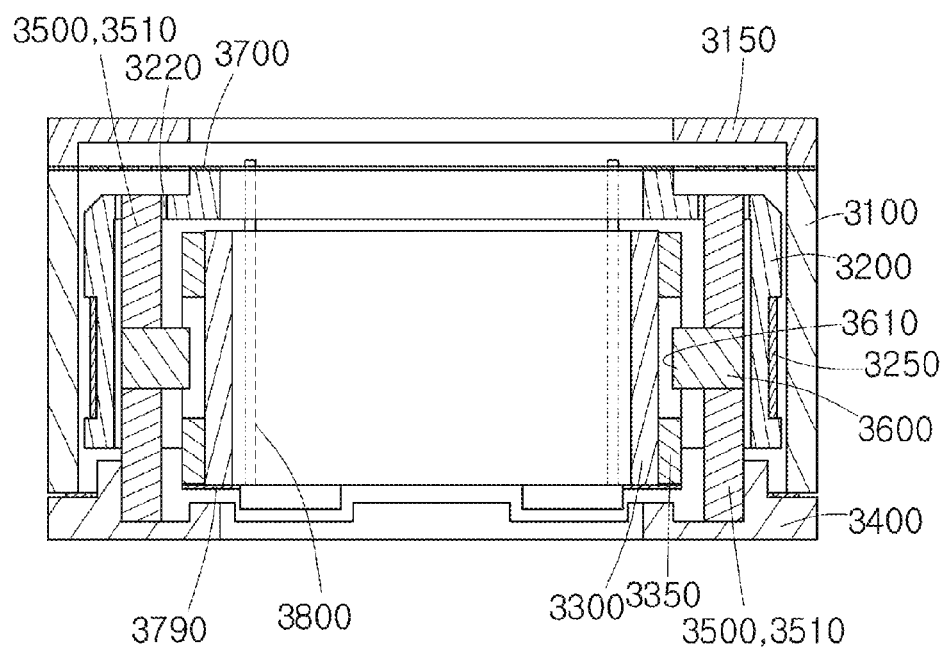
FIG. 4 is a sectional view taken along a line B-B in FIG. 1.

FIG. 4 is a sectional view taken along a line B-B in FIG. 1.

As illustrated in FIGS. 1 to 4, the photography device of the embodiment includes a housing 3100, a first blade 3200, a first coil member 3250, a second blade 3300, a second coil member 3350, a base 3400, a magnet 3500, a yoke member 3600, a first elastic member 3700 and a second elastic member 3800.

The housing 3100 has a hexahedral shape with opened upper and lower parts, and the first blade 3200 is disposed movable up and down in the inside of the housing 3100.

Also, an upper side of the housing 3100 is mounted with the first elastic member 3700 and a cover 3150 and a lower side of the housing 3100 is mounted with the base 3400.

The cover 3150 has a rectangular shape and has the center part opened in an up and down direction to pass the incident light of the lens therethrough.

The first blade 3200 has a hexahedral shape with an opened lower part and an upper part formed with an opening hole 3210 for passing the incident light of the lens therethrough, and the outside of the first blade 3200 is mounted with the first coil member 3250.

The first coil member 3250 is an electric wire through which electricity flows and is wound around the outer surface of the first blade 3200.

At this time, the outer corner part of the first blade 3200 is chamfered to prevent the first coil member 3250 from being damaged.

Also, the second blade 3300 is mounted in the inside of the first blade 3200 movably in a horizontal direction by the second elastic member 3800.

The second blade 3300 has a rectangular shape and has the center part opened in an up and down direction to insert the lens therein.

Also, the side surface of the second blade 3300 is mounted with the second coil member 3350.

The second coil member 3350 is an electric wire through which electricity flows and is wound in a direction perpendicular to the winding direction of the first coil member 3250.

Total four second coil members 3350 are mounted on the side surface of the second blade 3300, and they are disposed symmetrically with respect to the optical axis of the lens 3300.

Meanwhile, the base 3400 is mounted to the lower side of the housing 3100 and has a rectangular shape with the center part opened in an up and down direction.

An upper side of the base 3400 is mounted with the magnet 3500 and the yoke member 3600.

The magnet 3500 has a hexahedral shape and a plurality of the magnets is disposed symmetrically with respect to the first blade 3200.

Also, the magnet 3500 is mounted between the first blade 3200 and the second blade 3300 such that one surface thereof is disposed towards the first coil member 3250 and the other surface is disposed towards the second coil member 3350.

That is, as illustrated in FIG. 4, one surface of the magnet 3500 is disposed facing the inner surface of the first blade 3200 to be adjacent to the first coil member 3250 mounted on the outer surface of the first blade 3200, and the other surface is disposed facing the second coil member 3350 to be adjacent to the second coil member 3350.

As the magnet 3500 is fixed to the base such that one surface thereof is disposed towards the first coil member 3250 and the other surface is disposed towards the second coil member 3350 as described above, a gap between the first coil member 3250 and the magnet 3500 is reduced and thus overall structure and size are simplified.

Also, total 8 magnets 3500 are provided, two on each side surface of the first blade 3200 and divided into a first magnet 3510 that is in contact with the upper surface of the yoke member 3600 and a second magnet 3520 that is in contact with the lower surface of the yoke member 3600.

The first magnet 3510 and the second magnet 3520 are disposed such that their polarities are formed in an up and down direction and are symmetric with respect to the yoke member 3600, respectively.

That is, the polarities of the first magnet 3510 that is in contact with the upper surface of the yoke member 3600 are disposed such that the S pole is disposed in the upper direction towards the upper side and the N pole is disposed towards the lower side, and the polarities of the second magnet 3520 that is in contact with the lower surface of the yoke member 3600 are disposed such that the N pole is disposed in the upper direction towards the upper side and the S pole is disposed towards the lower side.

The yoke member 3600 having a hexahedral shape is made of a magnetic material and mounted on the upper side of the base 3400 so that its upper surface is in contact with the first magnet 3510 and the lower surface is in contact with the second magnet 3520.

Also, total four yoke members 3600 are provided, one on each side surface of the first blade 3200.

Also, the yoke member 3600 is, as illustrated in FIG. 4, disposed between the first blade 3200 and the second blade 3300 such that one surface thereof is disposed towards the first coil member 3250 to be adjacent to the first coil member 3250 and the other surface is disposed towards the second coil member 3350 to be adjacent to the second coil member 3350.

As the magnet 3500 is disposed such that its polarities are symmetric with respect to the yoke member 3600 and the yoke member 3600 is disposed such that one surface thereof is disposed towards the first coil member 3250 and the other surface is disposed towards the second coil member 3350 as described above, overall structure is simplified and the magnetic field of the magnet 3500 is sufficiently transferred to the first coil member 3250 and the second coil member 3350 to smoothen the movement of the first blade 3200 and the second blade 3300.

This yoke member 3600 is formed with a magnetism inducement projection 3610 that projects towards the second coil member 3350 and inserted in the center of the second coil member 3350.

The magnetism inducement projection 3610 has a rectangular shape and formed smaller than the width of the yoke member 3600, and is inserted in the center of the second coil member 3350 so that it is adjacent to the inner surface of the second coil member 3350.

This yoke member 3610 functions to induce the magnetic field, which is generated from the magnet 3500 disposed upper and lower side of the yoke member 3600, towards the second coil member 3350.

By forming the magnetism inducement projection 3610 that projects towards the second coil member 3350 and inserted in the center of the second coil member 3350 as described above, the magnetic field of the magnet 3500 can be induced well towards the second coil member 3350.

Also, the first magnet 3510 that is in contact with the upper surface of the yoke member 3600 is disposed at a height similar to that of the upper surface of the first blade 3200 and inserted in a through hole 3220 formed in the upper side of the first blade 3200.

The through hole 3220 has a rectangular shape and is formed greater than the width of the magnet 3500, and total four through holes 3220 are formed symmetrically with respect to the opening hole 3210.

By forming the through hole 3220, into which the magnet 3500 is penetratively inserted upon the up and down movement of the first blade 3200, in the upper side of the first blade 3200 as described above, it is possible to reduce the size of the first blade 3200 and facilitate the up and down movement of the first blade 3200 with avoiding the magnet.

Meanwhile, the second blade 3300 is mounted with a third elastic member 3790 and the second elastic member 3800.

The third elastic member 3790 has a thin plate shape and an outer side thereof is mounted to the base 3400 and an inner side is mounted to the lower end of the second blade 3300 to elastically support the second blade 3300 in an up and down direction.

The second elastic member 3800 is made of a wire spring formed long in an up and down direction, and one end thereof is coupled and fixed to the upper end of the first blade 3200 and the other end is coupled and fixed to the lower end of the second blade 3300 to elastically support the second blade 3300 so that the second blade 3300 moves horizontally in the inside of the first blade 3200.

Also, the second elastic member 3800 is made of a material through which electricity flows, and is electrically connected with an end of the second coil member 3350.

Total four second elastic members 3800 are mounted on the lower end of the second blade 3300, and they are disposed symmetrically with respect to the optical axis of the lens.

Also, the first blade 3200 is mounted with the first elastic member 3700.

The first elastic member 3700 has a thin plate shape, and an outer side thereof is coupled and fixed to the upper side of the housing 3100 and an inner side is coupled and fixed to the upper side of the first blade 3200.

The outside and the inside of the first elastic member 3700 are connected elastically, so that the first elastic member can be contracted and relaxed in an up and down direction to elastically support the first blade 3200 movably up and down in the inside of the housing 3100.

Also, the side surface of the first elastic member 3700 is formed with a terminal part 3750 which is bent toward the side surface of the housing 3100 and connected to the external power source, and the terminal part is connected with the external power source and functions to supply power to the first coil member 3250 and the second coil member 3350.

Specifically, the first elastic member 3700 includes a conductor layer (not illustrated) which is connected with the external power source to supply power to the first coil member 3250 and the second coil member 3350 and an insulation layer which coats the conductor layer.

The conductor layer consists of a plurality of electric circuits for transferring power to the first coil member 3250 or the second elastic member 3800, and is electrically connected with the external power source.

That is, the conductor layer is connected directly with the end of the first coil member 3250 to transfer external power to the first coil member 3250 and is electrically connected with one end of the second elastic member 3800 to supply the power to the second coil member 3250 connected with the other end of the second elastic member 3800.

As one end of the second elastic member 3800 that elastically supports the second blade 3300 in a horizontal direction is electrically connected with the conductor layer and the other end is electrically connected with the end of the second coil member 3350 to supply the external power to the second coil member 3350 as described above, the second elastic member performs both functions of supplying the power and elastically supporting the second blade 3300 and thus reduces total number of elements and simplifies the structure.

The insulation layer is made of a material through which electricity does not flow, and coats the conductor layer to prevent the conductor layer from being damaged and cut off external electric noise.

Also, the insulation layer is made of a flexible material and thus is easily bent and has elasticity.

As the first elastic member that is mounted to the first blade 3200 to elastically support the first blade 3200 in an up and down direction includes the conductor layer which is connected with the external power source to supply power to the first coil member 3250 and the second coil member 3350 and the insulation layer which coats the conductor layer as described above, the first elastic member performs both functions of supplying the power and elastically supporting the first blade 3200 and thus reduces total number of elements and simplifies the structure.

Operation of the photography device in accordance with the embodiment constituted as described above will be described.

Figure 5:
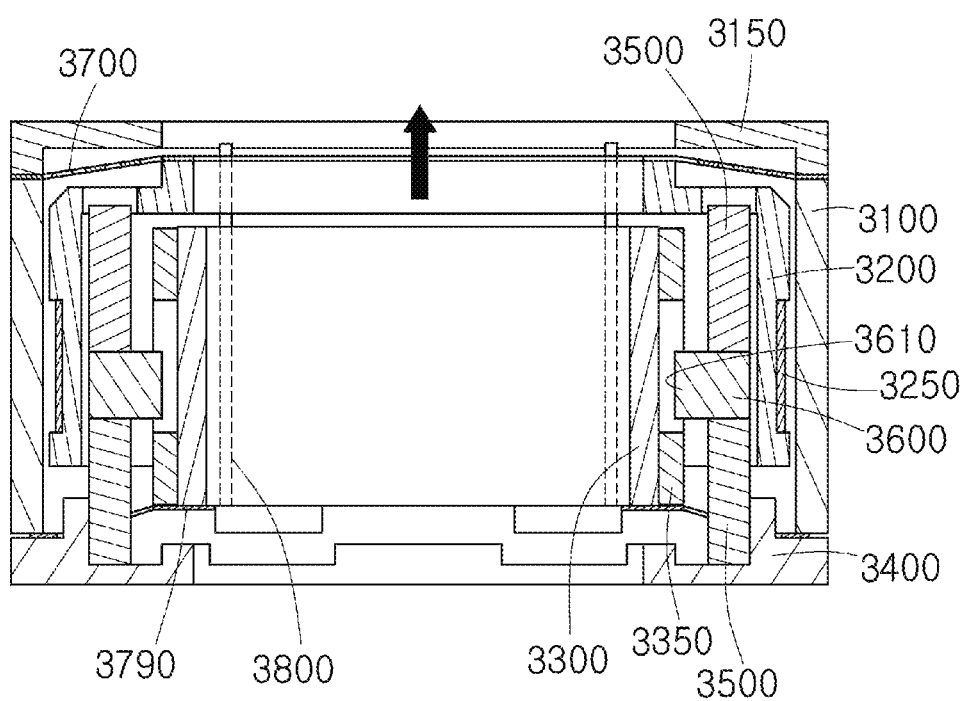
FIGS. 5 and 6 are sectional views illustrating operation state of the photography device in FIG. 4.
Figure 6:
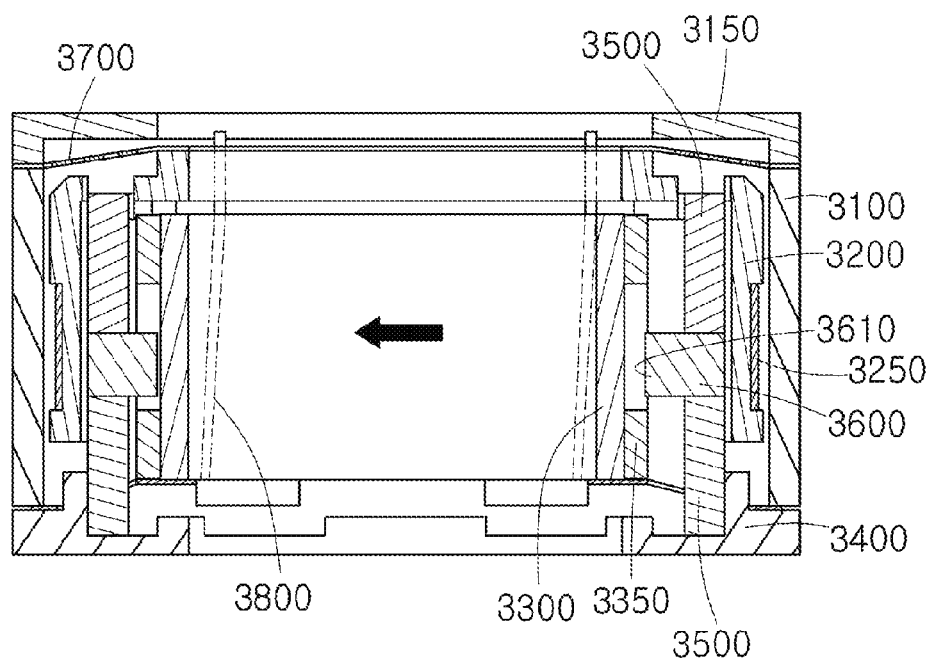

FIG. 4 is a sectional view taken along a line B-B in FIG. 1; and FIGS. 5 and 6 are sectional views illustrating operation state of the photography device in FIG. 4.

As illustrated in FIG. 4, before the power is applied to the first coil member 3250 and the second coil member 3350, the first blade 3200 is disposed with being floated above the base 3400 by the first elastic member 3700 and the third elastic member 3790 and the first elastic member 3700 keeps the horizontal state.

Also, the second blade 3300 is disposed with being floated above the base 3400 in the inside of the first blade 3200 by the second elastic member 3800.

Also, the gaps between the first coil member 3250 and the outer surface of the magnet 3500 are symmetric with respect to the optical axis, and the gaps between the inner surface of the magnet 3500 and the second coil member 3350 are symmetric with respect to the optical axis.

As illustrated in FIG. 5, when the power is applied to the first coil member 3250, the first blade 3200 ascends by the interaction of the first electromagnetic field generated in the first coil member 3250 with the magnetic field generated in the magnet 3500.

As the first blade 3200 ascends, the first elastic member 3700 is relaxed upwardly while the inside thereof ascends together with the first blade 3200.

Also, the second blade 3300 which is connected with the inside of the first elastic member 3700 and also connected with the inside of the first blade 3200 by the second elastic member 3800 also ascends together with the ascent of the inside of the first elastic member 3700.

At this time, as illustrated in FIG. 5, since the second blade 3300 mounted with the second coil member 3350 moves in an up and down direction without left and right movement, the gap between the second coil member 3350 and the inner surface of the magnet 3500 is not changed.

Therefore, upon the horizontal movement of the second blade 3300, the magnetic field of the magnet 3500 is uniformly transferred to both the second coil members 3350 disposed in both sides of the second blade 3300 and thus the horizontal movement of the second blade 3300 is smoothened.

Also, the first coil member 3250 can be moves down when the direction of the power applied is inversed.

Meanwhile, when the power is applied to the second coil member 3350 with the first blade 3200 being ascended, the second blade 3300 moves to the left independently of the first blade 3200 in the inside of the first blade 3200.

As the second blade 3300 moves to the left, the second elastic member 3800 is deformed towards the left, and the second elastic member 3800 elastically supports the second blade 3300 by its elastic restoring force.

The second blade 3300 is movable to the right or in a forward and rearward direction depending on a direction of the current applied to the second coil member 3350.

As the magnet 3500 is disposed between the inner surface of the first blade 3200 and the outer surface of the second blade 3300, the first blade 3200 and the second blade 3300 move up and down together, and the second blade 3300 moves horizontally independently of the first blade 3200 as described above, a gap between the second coil member 3350 mounted to the second blade 3300 and the magnet 3500 is kept uniformly upon the up and down movement of the first blade 3200 and thus the magnetic field of the magnet 3500 is uniformly transferred to both the second coil members 3350 disposed in both sides of the second blade 3300, thereby smoothening thus the horizontal movement of the second blade 3300.

On the contrary, a gap between the first coil member 3250 and the magnet 3500 is kept uniformly upon the horizontal movement of the second blade 3300 to smoothen the up and down movement of the first blade 3200.

The photography device with anti-shake function of the present invention is installed in a compact electronic device such as a hand-held device and moves the lens in a direction correcting shake when the shake is generated upon photographing of an object to thereby allow the object to be clearly photographed.

While the present invention has been described with respect to the specific embodiments, it will be apparent to those skilled in the art that various changes and modifications may be made without departing from the spirit and scope of the invention as defined in the following claims.

What is claimed is:

1. A photography device with anti-shake function, comprising:
    a housing;
    a first blade disposed in an inside of the housing and including a lens therein, the first blade being movable in an up and down direction;
    a first coil member wound around outside of the first blade;
    a first elastic member electrically connected with the first coil member and elastically supporting the first blade in the up and down direction;
    a second blade disposed horizontally movably in an inside of the first blade and mounted with a second coil member in an outside surface thereof;
    a second elastic member formed of a vertical wire spring, an upper end of the second elastic member being connected to the first blade and a lower end of the second elastic member being connected to the second blade; and
    a magnet disposed between the first blade and the second blade,
    wherein the first blade and the second blade moves up and down together by interaction of a first electromagnetic field generated when power is applied to the first coil member with a magnetic field generated in the magnet, and the second blade moves horizontally independently from the first blade by interaction of a second electromagnetic field generated when the power is applied to the second coil member with the magnetic field generated in the magnet.

2. The photography device of claim 1, further comprising:
    a base mounted to a lower side of the housing,
    wherein the magnet has one surface disposed towards the first coil member and the other surface disposed towards the second coil member and fixed to the base, and the first coil member is wound around the first blade and the second coil member is wound on a side surface of the second blade in a direction perpendicular to the winding direction of the first coil member.

3. The photography device of claim 1, wherein the first elastic member has a plate shape, of which outer portion is fixed to the housing and of which inner portion is mounted to the first blade to elastically support the first blade in an up and down direction, and
    wherein the first elastic member includes a conductor layer connected with an external power source to transfer power to the first coil member and the second coil member; and an insulation layer which coats the conductor layer.

4. The photography device of claim 3,
    wherein the first coil member receives external power as an end of the first coil member is electrically connected with the conductor layer of the first elastic member, and the second coil member receives the external power as an end of the second coil member is electrically connected with the other end of the second elastic member and one end of the second elastic member is electrically connected with the conductor layer of the first elastic member.

5. The photography device of claim 1, wherein an upper side of the first blade is formed with a through hole in which the magnet is penetratively inserted when the first blade moves up and down.

6. The photography device of claim 1, further comprising:
    a yoke member which is in contact with the magnet,
    wherein the magnet includes a first magnet which is in contact with an upper surface of the yoke member and a second magnet which is in contact with a lower surface of the yoke member, and polarities of the first magnet and second magnet are formed in an up and down direction such that the polarities are disposed symmetrically in the up and down direction, and the yoke member has one surface disposed towards the first coil member and the other surface disposed towards the second coil member.

7. The photography device of claim 6, wherein the yoke member is formed with a magnetism inducement projection which projects towards the second coil member and inserted in a center of the second coil member and the magnetism inducement projection induces the magnetic field of the magnet towards the second coil member.

* * * * *